United States Patent [19]

Cattaneo et al.

[11] 4,176,791

[45] Dec. 4, 1979

[54] AUTOMATICALLY CONTROLLED IRRIGATION SYSTEM

[75] Inventors: Maurizio Cattaneo; Renzo Masoero, both of Turin, Italy

[73] Assignee: Fiat Societa per Azioni, Turin, Italy

[21] Appl. No.: 856,950

[22] Filed: Dec. 2, 1977

[30] Foreign Application Priority Data

Dec. 30, 1976 [IT] Italy .............. 70139 A/76

[51] Int. Cl.² .......................................... B05B 15/00
[52] U.S. Cl. .................................... 239/76; 239/99; 239/269
[58] Field of Search ............... 239/67, 68, 76, 99, 239/542, 212, 266–269, 533.1, 323, 327; 222/335

[56] References Cited

U.S. PATENT DOCUMENTS

| | | | |
|---|---|---|---|
| 3,294,290 | 12/1966 | Erickson et al. .............. | 222/335 |
| 3,321,138 | 5/1967 | Curry ............................. | 239/99 |
| 3,353,712 | 11/1967 | Prescott ......................... | 222/335 X |
| 3,788,544 | 1/1974 | Koskinenm ..................... | 239/533.13 |
| 3,818,928 | 6/1974 | Carsten .......................... | 239/99 |
| 3,848,808 | 11/1974 | Fetty et al. ..................... | 239/327 |
| 3,976,250 | 8/1976 | Bentzinger ...................... | 239/542 |

*Primary Examiner*—John J. Love
*Attorney, Agent, or Firm*—Sughrue, Rothwell, Mion, Zinn and Macpeak

[57] ABSTRACT

An irrigation system of the type comprising a plurality of nozzles spaced along a pipeline fed at one end from a source of supply of irrigation liquid, which latter may be purely water or may be water with additives, in which in order to avoid different spray rates due to a loss in pressure along the pipeline each nozzle is provided with a valve and an associated resilient subsidiary reservoir, the valves operating to close off the nozzles while all the subsidiary reservoirs charge up to the line pressure and then, when a control valve diverts the source of supply to a discharge outlet all the nozzles receive liquid in the same pressure from their associated subsidiary reservoir; when the subsidiary reservoirs are all back at atmospheric pressure the cycle recommences.

8 Claims, 2 Drawing Figures

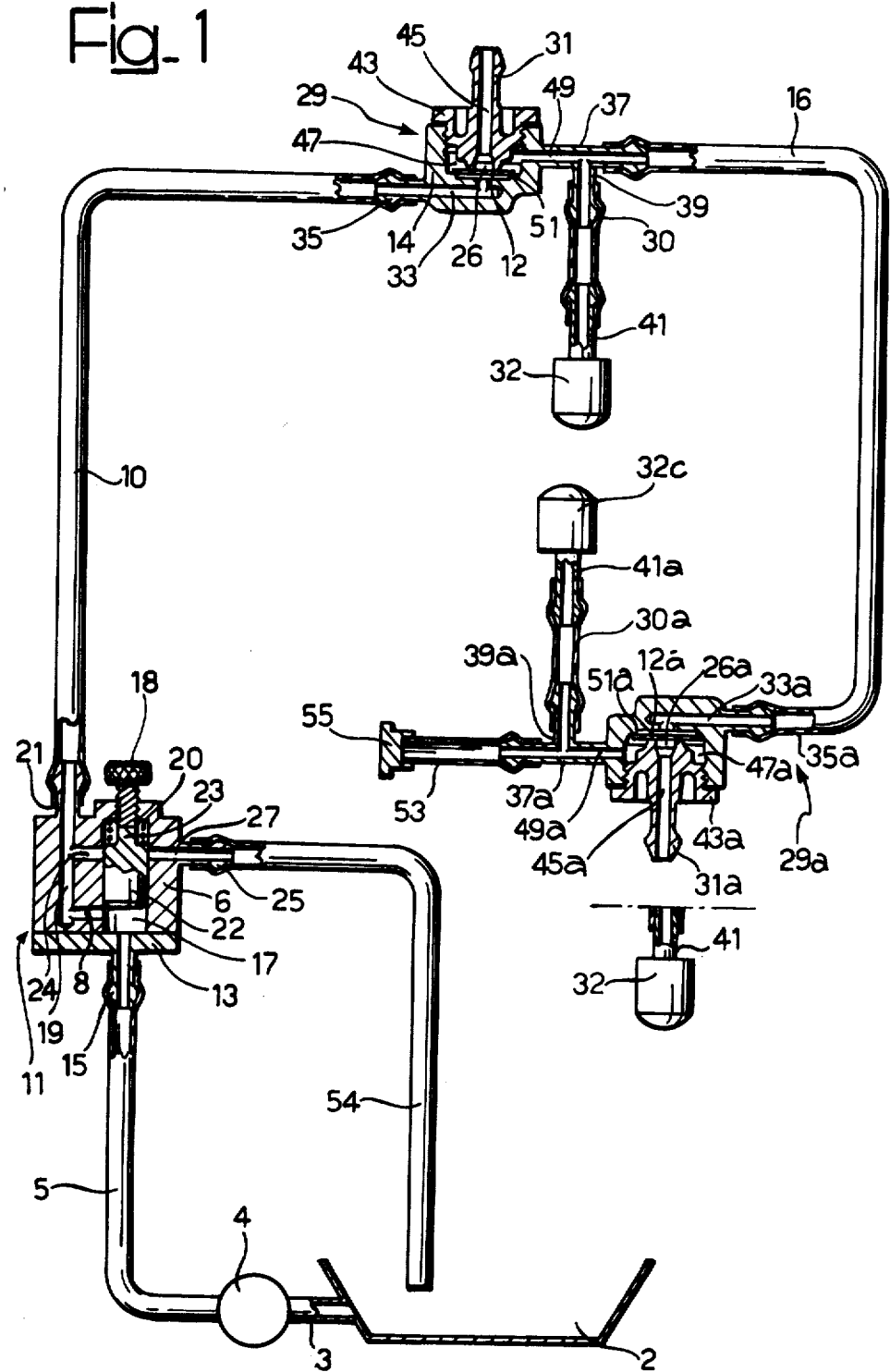

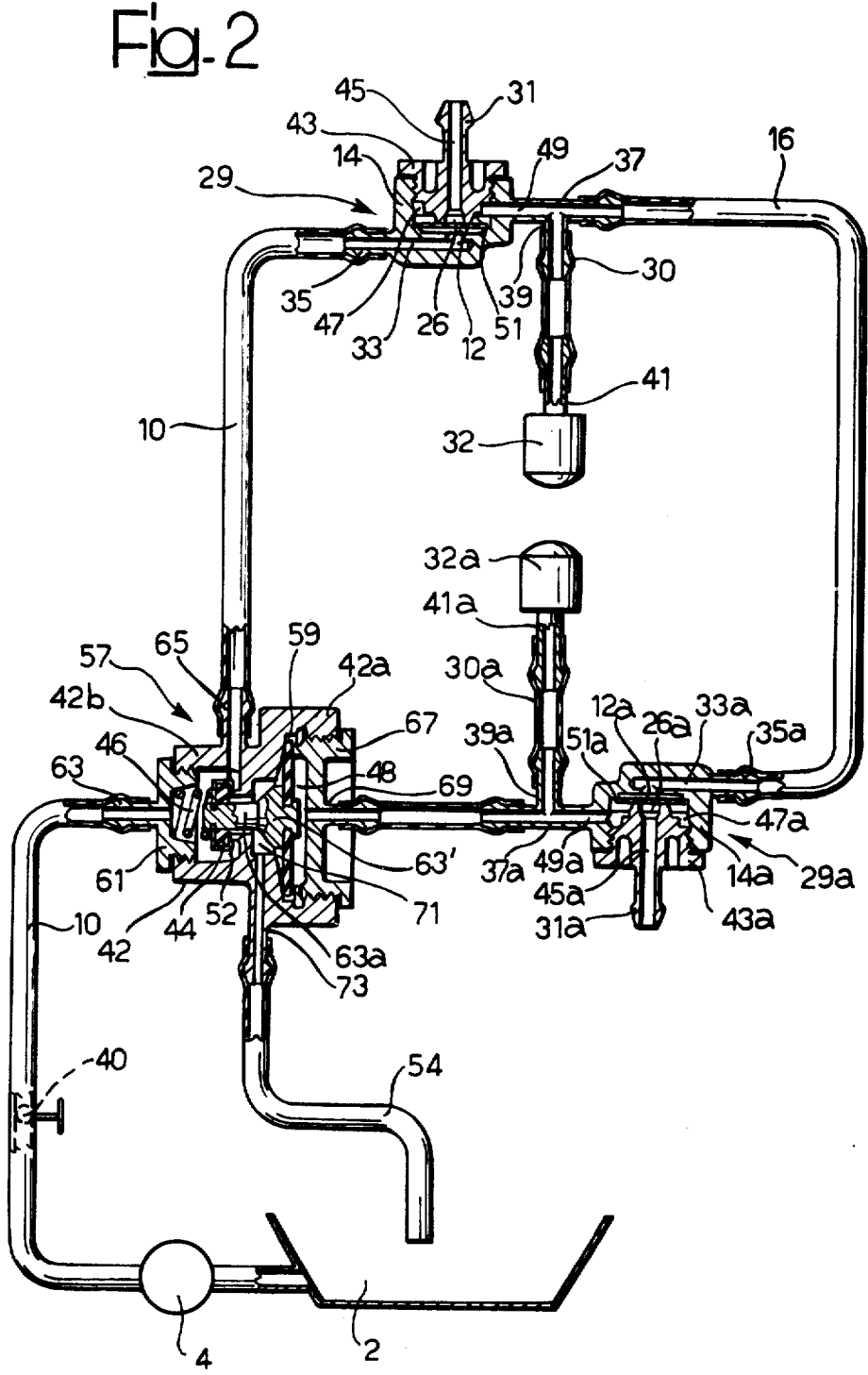

AUTOMATICALLY CONTROLLED IRRIGATION SYSTEM

The present invention relates to an automatically controlled irrigation system.

In agriculture use is often made of an irrigation system including a pipeline having a plurality of nozzles which, in operation of the system, continuously discharge water drawn directly from a water source such as, for example, from the normal mains water supply.

Such an irrigation system has the disadvantage, however, that when using long pipes, such as may be necessary, for example, in the irrigation of a fruit orchard, there is a drop in the water pressure between the beginning and the end of the pipeline, and because of this the quantity of water discharged from the nozzles at the end of the pipeline remote from the source of supply is much less than that discharged from the nozzles adjacent the end of the pipeline connected to the source of supply. This type of system thus requires to have a pipeline which has a decreasing cross-section along its length, although even the part of smallest cross-section must necessarily nevertheless be rather large and such a system is therefore rather costly.

The object of the present invention is to provide an irrigation system in which these disadvantages are avoided and the quantity of water supplied to each nozzle is independent of the nozzle position itself, with pipes of equal sections and small diameter.

According to the present invention there is provided an irrigation system for distributing a liquid from a source of supply thereof, characterised in that it comprises a pipeline having a plurality of liquid distribution nozzles, storage means located between adjacent pairs of nozzles for storing liquid under pressure, and means for cyclically charging the said storage means with liquid and discharging the liquid from the said storage means through respective associated nozzles.

Two embodiments of the invention will now be more particularly described, by way of example, with reference to the accompanying drawings, in which:

FIG. 1 is a schematic diagram illustrating, partly in section, a semi-automatic irrigation system formed as a first embodiment of the invention; and FIG. 2 is a schematic diagram illustrating, partly in section, an automatic irrigation system formed as a second embodiment of the present invention.

Referring now to FIG. 1 of the drawings, the semi-automatic irrigation system comprises a source of water, illustrated as a reservoir 2, which may be merely a mains water pipe, a pump 4 connected by a pipe 3 to the reservoir 2 and delivering, along a pipe 5, water drawn from the reservoir 2 to a control valve 11 comprising a body 6 and a cover plate 13 having a spigot 15 to which the pipe 5 is connected. The spigot 15 has an interior passage communicating with a valve chamber 17 within the body 6, the valve chamber being controlled by a valve plunger 23 the position of which is determined by a control knob 18 attached to a threaded shaft screwed into the body 6 and assisted by a spring 20.

The valve body 6 has two connector spigots 21 and 25, the former has an interior passage communicating with a passage 19 which is linked to the valve chamber 17 by two transverse passages 8 and 24 which open into the valve chamber 17 at positions spaced from one another along the length thereof. The transverse passage 24 is aligned across the valve chamber 17 with a discharge passage 27 which communicates with the spigot 25 to which is attached a discharge pipe 54 leading back to the reservoir 2.

To the spigot 21 is connected a length of pipe 10 leading to a diaphragm valve generally indicated 29 and incorporating a spray nozzle 31. In fact, the spray nozzle 31 is formed as part of an insert 43 which is screwed into a valve body 14 to form the valve nozzle assembly 29.

The body 14 has a spigot 35 to which the pipeline 10 is connected, and this communicates with an interior passage 33 in the body 14 which opens through a small transverse port into an interior chamber 47 of the valve body 14. The chamber 47 has an annular shoulder 51 on which rests a flexible diaphragm 12. The insert 43 has a conical end at which opens the mouth 26 of an interior passage 45 which passes through the spray nozzle 31. Communicating with the chamber 47 on the far side of the diaphragm 12 from the opening by means of which the passageway 33 communicates with the chamber 47 is an outlet passage 49 which extends into a spigot 37 to which is attached a further pipe 16 leading to an identical spray nozzle assembly 29a.

The spigot 37 has a transverse branch 39 having a hollow interior communicating with the passage 49 and joined by a pipe 30 to a spigot 41 of a resilient reservoir 32 capable of storing a quantity of water under pressure by deforming elastically.

The valve nozzle assembly 29a is identical with that just described and is connected to a pipe 53 shown blanked off with a blanking plug 55. Of course, further valve nozzle assemblies can be connected in sequence along a greater length of line although only two have been shown in the diagram for simplicity. The number of valve nozzles which are provided will be depend on the particular circumstances of use. The components of the valve 29a are identified with the same reference numerals as the valve 29, with the addition of the "a."

In use of the system described above the valve knob 18 is unscrewed allowing the valve plunger 22 to move away from the end cover 13 to the position shown in FIG. 1 where it permits communication between the interior of the spigot 15 and the transfer passage 8. Water drawn from the reservoir 2 can then be pumped along the pipe 5 by the pump 4 and passes through the valve, via the chamber 17, the transfer passage 8, the passage 19 and the spigot 21 into the pipe 10 which conveys it to the valve nozzle 29 where it passes through the interior passage 33 and presses the resilient diaphragm 12 over the mouth 26 of the passage 45 leading to the spray nozzle 31. The flexibility of the resilient diaphragm 12 permits the periphery to flex, however, so that water under pressure can flow around the rim of the diaphragm into the chamber 47 and from there along the passage 49 and into the reservoir 32 and the next section 16 of the pipe.

At the next spray nozzle 29a, the same occurs but since the outlet is blanked off by the blanking plug 55 the reservoir 32a charges to the maximum pressure supplied by the pump 4 and this pressure is also built up in the reservoir 32. During this phase of operation the spray nozzles 31, 31a, themselves remain closed by the diaphragms 12, 12a.

Although the nozzles are shown in different orientations in FIG. 1, it will be appreciated that these may, in a practical system, all be pointing upwardly or inclined at a suitable angle in accordance with the irrigation which is required; for example, the nozzles may be arranged to provide a fine spray in order to humidify the air as well as water the ground, or may be pointed directly at the ground to direct a jet of water around the roots of a plant leaving the foliage dry. The particular setting and orientation of the nozzles will depend on the area in which the system is to be used and the requirements of the crop being grown.

In the next phase of operation the knurled knob 28 is turned to screw down the valve plunger 22 until it closes off communication between the valve chamber 17 and the transfer passage 8: at the same time displacement of the valve plunger 22 opens communication between the passage 24 and the passage 27 since the neck 23 of the plunger 22 is of narrower dimensions than the main body thereof. Water under pressure in the pipe 10 can then drain through the valve 11, via the passage 19, the transfer passage 24, the upper part of the valve chamber 17 (on the side of the valve plunger 22 remote from the spigot 15), the passage 27 and the spigot 25 to the discharge pipe 54 leading to the reservoir 2. With this drop in pressure in the pipe 10 the diaphragm 12 experiences a pressure difference since the pressure in the chamber 47 remains high due to the stored water in the resilient reservoir 32. The diaphragm 12 is thus pressed against the annular shoulder 51 and, due to this pressure difference, flexes away from the mouth 26 of the passage 45 permitting the water to be delivered through the nozzle 31. The pressure at which the water is delivered through the nozzle 31 does not depend on the position of the valve 29 along the pipe 10, but only on the pressure of water in the reservoir 32 since the diaphragm 12 of the valve 29 closes off communication between the pipe 16 and the pipe 10 and the pipe 16 cannot communicate with the pipe 53 downstream therefrom once the pressure has dropped below the initial charging pressure due to the identical action taking place at the diaphragm 12a. The nozzles 31, 31a (and any other nozzles in the system) thus discharge water all at the same pressure, determined by the reservoirs 32, 32a, etc., and therefore the number of nozzles and the length of pipeline can be extended considerably above the limits for conventional systems in which the nozzles are directly connected to the pipe. Once the reservoirs 32, 32a have discharged completely the valve is opened again by unscrewing the knurled knob 18 and the cycle repeats itself.

The embodiment of FIG. 2 is similar to that of FIG. 1 in that the valve nozzles 29, 29a, are identical, but the control valve 11 is replaced with an automatic valve generally indicated 57. This valve comprises a valve body 42 of integral construction comprising a larger part 42a and a smaller part 42b. Into the smaller part 42b is screwed a plug 61 having a hollow connector spigot 63 which communicates with the interior chamber 52 defined by the plug 61 and the smaller part 42b of the valve body 42.

The larger part 42a of the valve body receives a screwed plug 67 which also has a hollow connector spigot 69. Within the valve body 42 there is a valve element 63' having a valve stem 63a which passes through a narrow passage separating the smaller part 42b of the valve body from the larger part 42a thereof. The valve stem 63a is substantially smaller than this passage in the valve body leaving adequate clearance for fluids to flow between the valve stem and the walls of the passage. Secured to the valve stem where it projects into the chamber 52 defined by the smaller part 42b of the valve body and the plug 61 is a resilient ring valve shutter 44 against which bears a spring 46 compressed by the plug 61 so that the ring 44 closes off communication between the chamber 52 and the intermediate passage linking the smaller part 42b with the larger part 42a of the valve body.

The body 63 of the valve element carries a diaphragm 59 the rim of which is trapped between the larger part 42a of the valve body and the plug 67 when it is screwed into position thereby separating the interior of the larger part 42a of the valve body into two chambers, a first chamber 71 between the diaphragm 59 and the linking passage through which the valve stem 63a projects, and a second chamber 48 between the diaphragm 59 and the valve plug 67, which chamber communicates with the hollow interior of the connector spigot 69 to which is connected a pipe 56 leading from the valve nozzle 14a.

The valve body 42 also has a first connector spigot 65 the hollow interior of which communicates with the chamber 52 in the smaller part 42b of the valve body 42, and to which is connected the pipeline 10 leading to the first valve nozzle 29, and a second connector spigot 73 the hollow interior of which communicates with the closed chamber 71 defined between the diaphragm 59 and the passage linking the chambers 71 and 52.

Between the pump 4 and the valve 57 there is an adjustable restrictor throttle 40 the setting of which determines the rate of flow of water from the pump 4 towards the valve 57.

The automatic system described above operates as follows: water from the pump 4 enters the valve 57 through the hollow spigot 63 and passes through the chamber 52 and out through the hollow spigot 65 into the line 10 leading it to the first nozzle valve 29. The spring 46 presses the resilient sealing ring 44 against the mouth of the passage joining the chambers 52 and 71 and therefore no water can pass through from the chamber 52 in this direction. The nozzle 14 operates as described in relation to FIG. 1 charging the reservoir 32 and permitting water to pass along the line 16 to the second nozzle 29a. In the embodiment shown only two nozzles are provided although it will be appreciated that between the nozzle valve 29 and the nozzle valve 29a there could be interposed as many identical nozzle valves as were required for the irrigation system.

Water leaving the nozzle valve 29a passes along the pipe 56 and enters through the hollow spigot 69 into the chamber 48. As the pressure in the chamber 48 builds up the force exerted on the valve body 63 by the diaphragm 59 increases until it overcomes the force applied by the spring 46 the value of which is chosen to be appropriate for this purpose. The valve element 63 thus displaces to the left of FIG. 2 carrying with it the sealing ring 44 which thus opens communication between the valve chamber 52 and the valve chamber 71. Water from the valve chamber 52 can thus flow into the chamber 71 and from there through the communicating passage leading to the hollow spigot 73 and out into the reservoir 2 via the pipe 54. This causes, automatically, a drop in the pressure along the pipeline 10 equivalent to the drop in pressure caused by screwing down the valve 23 by the knob 18 in the embodiment of FIG. 1 and, likewise, the valve nozzle 29 operates by flexing the diaphragm 12 closing off back-flow of water and allowing the water stored in the subsidiary resilient reservoir 32 to flow out through the nozzle 31. This process continues along the nozzles until the nozzle 29a is reached where reduction in the pressure stored in the resilient reservoir 32a due to discharge of this through the nozzle 31a causes a drop in pressure in the valve chamber 48 allowing the spring 46 to push the valve element 63' back to its original position closing the passage linking the valve chambers 52 and 71 by pressing the sealing ring 44 against the mouth thereof and allowing water to flow again along the pipeline 10 to charge the valves 29, 29a etc.

If it were required for the cycle to operate very rapidly, instead of resilient reservoirs 32, 32a being employed these could be dispensed with and the pipes 10, 16, made of plastics material having a certain resilience sufficient to store water which would thus be ejected through the nozzles 31, 31a, in short bursts as the pipes expanded and contracted with the movement to and fro of the valve element 63' alternately closing and opening the mouth of the passage linking the valve chambers 52 and 71.

In embodiments employing the reservoirs 32, 32a the resilient storage may be obtained by the use of a closed elastic cylinder, or a storage tank with a diaphragm, or by means of resilient hollow spheres. Since the resilience of the reservoirs 32, 32a is effectively fixed, the quantity of water stored in these reservoirs can be adjusted by adjusting the force exerted by the spring 46 on the sealing ring 44, for example by screwing in or unscrewing the plug 61. This then determines the force required on the diaphragm 59 to displace the sealing ring 44, which thus determines the pressure under which water is stored in the reservoirs 32, 32a and therefore the volume of the stored water. As mentioned above filling speed is adjusted by means of a variable throttle valve 40.

All the passages within the valves 29, 29a are of reasonable dimensions so that the jet issuing from the nozzles 31, 31a can, by ensuring that these are of suitable dimensions, be either a high speed jet or a spray or merely a flow of water for distribution to root watering channels. If the flow of water from the nozzles 31, 31a is arranged to be at high speed self-cleansing of the jets is thereby effected and for this reason water containing additives can be used since clogging of the passages and jets is unlikely.

What is claimed is:

1. In an irrigation system for distributing an irrigation liquid from a source of supply thereof, and comprising:
    a pipeline, and
    a plurality of liquid distribution nozzles spaced along said pipeline,
    storage means located between adjacent pairs of nozzles and communicating with said pipeline, said storage means storing irrigation liquid under pressure in use,
    means for cyclically charging each of said storage means with irrigation liquid from said pipeline and for discharging said irrigation liquid from said storage means through respective associated nozzles, and
    a control valve between said source of supply of irrigation liquid and the nearest of said nozzles along said pipeline, said control valve operating to initiate the charging of said storage means by connecting said pipeline leading to said source of supply, and the discharging of said storage means through said associated Nozzles by connecting said pipeline leading to said nearest nozzle to a discharge tube, and wherein said control valve is automatically operable and includes:
    a diaphragm,
    a valve element attached to said diaphragm,
    means feeding irrigation liquid from a point along said pipeline between said source of supply of irrigation liquid and the first nozzle along said pipeline to one side of said diaphragm and valve element assembly,
    means feeding irrigation liquid from a point along said pipeline downstream of the last nozzle along said pipeline to the other side of said diaphragm and valve element assembly,
    said diaphragm and valve element assembly operating as a differential piston for comparing the pressure in the pipeline between said source of supply and said first nozzle along said pipeline with the pressure in said pipeline downstream of said last nozzle along the pipeline.

2. The irrigation system of claim 1, wherein there are further provided means to adjust the quantity of liquid stored in said storage means during each charging cycle.

3. The irrigation system of claim 2, wherein the means to regulate the quantity of liquid stored in said storage means comprise:
    a resilient biasing element acting on said valve element constituting part of said differential piston, and
    means for adjusting said resilient biasing means such that said differential piston operates to displace said valve element part thereof at a pressure selected by the adjustment.

4. An irrigation system for distributing an irrigation liquid from a source of supply therefor comprising:
    an elongated pipeline,
    a plurality of liquid distributing nozzles spaced in series along the pipeline,
    a plurality of liquid storage means communicating with the pipeline, each such storage means located adjacent and downstream from a corresponding nozzle,
    a plurality of pressure responsive valve means in the pipeline, each of such valve means associated with a corresponding nozzle and adapted to open and close the discharge from the nozzle and flow through the pipeline, each such valve means operable to open the pipeline to allow flow into the corresponding storage means and simultaneously close communication between the pipeline downstream of the nozzle and the nozzle outlet upon predetermined pressure in the pipeline upstream of the nozzle, and each such valve means operable to close the pipeline and open fluid communication between the nozzle and the downstream portion of the pipeline and storage means upon a lesser predetermined pressure in the pipeline upstream of the nozzle.

5. The irrigation system of claim 4 wherein at least some of such storage means are resilient tubing forming the pipeline downstream of one nozzle and upstream from a following valve means.

6. The irrigation system of claim 4 wherein at least one of such storage means is a resilient reservoir capable of storing liquid under pressure by deforming elastically.

7. An irrigation system of claim 4 wherein each of the pressure sensitive valve means is a resilient diaphragm valve having a single flexible diaphragm without openings therein, a portion of the diaphragm flexing under predetermined pressure upstream of the nozzles to open the pipeline to allow liquid to fill the storage means and another portion of the diaphragm valve flexing to close the pipeline and simultaneously open the passage to the corresponding nozzle on the lesser predetermined pressure.

8. An irrigation system as in claim 4 further comprising an automatically operable control valve between the source of supply of irrigation liquid and the nearest of the nozzles along the pipeline, the control valve automatically operable to initiate and control the pressure of the liquid in the pipeline and thereby control operation of the pressure responsive valve means and the discharge of liquid from the nozzles.

* * * * *